(12) United States Patent
Bienvenu et al.

(10) Patent No.: US 10,746,130 B2
(45) Date of Patent: Aug. 18, 2020

(54) COMPOSITE PANEL AND AIRCRAFT TURBOJET ENGINE NACELLE COMPRISING SUCH A PANEL

(71) Applicant: Safran Nacelles, Gonfreville l'Orcher (FR)

(72) Inventors: Philippe Bienvenu, Gonfreville l'Orcher (FR); Jean-Claude Rivoal, Gonfreville l'Orcher (FR); Michel Lefebvre, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 53 days.

(21) Appl. No.: 15/810,267

(22) Filed: Nov. 13, 2017

(65) Prior Publication Data

US 2018/0066608 A1 Mar. 8, 2018

Related U.S. Application Data

(63) Continuation of application No. PCT/FR2016/051108, filed on May 11, 2016.

(30) Foreign Application Priority Data

May 12, 2015 (FR) .................................... 15 54228

(51) Int. Cl.
*F02K 1/82* (2006.01)
*B32B 15/01* (2006.01)
(Continued)

(52) U.S. Cl.
CPC ................ *F02K 1/827* (2013.01); *B32B 1/00* (2013.01); *B32B 3/12* (2013.01); *B32B 3/18* (2013.01);
(Continued)

(58) Field of Classification Search
CPC ............... F02K 1/827; E04B 2001/748; E04B 2001/8476; F02C 7/04; F02C 7/24
See application file for complete search history.

(56) References Cited

U.S. PATENT DOCUMENTS 2,077,729 A * 4/1937 Wilcox ..................... B63B 3/10
114/12
2,744,042 A * 5/1956 Pace .................. B29D 99/0089
264/46.5
(Continued)

FOREIGN PATENT DOCUMENTS

CN 203393517 1/2014
JP H06007863 1/1994
(Continued)

OTHER PUBLICATIONS

International Search Report for International Application PCT/FR2016/051108, dated Oct. 7, 2016.

*Primary Examiner* — Eldon T Brockman
*Assistant Examiner* — Wesley Le Fisher
(74) *Attorney, Agent, or Firm* — Burris Law, PLLC

(57) ABSTRACT

The present disclosure relates to a composite panel having a sandwich structure formed by a central core having a primary cellular structure, for example, of the honeycomb type, sandwiched between two skins. The primary cellular structure includes an array of main cells. The composite panel further includes a plurality of pins, each pin being, on the one hand, arranged to be housed and to cooperate inside a main cell and, on the other hand, formed of a secondary cellular structure having an array of secondary cells.

9 Claims, 3 Drawing Sheets

(51) Int. Cl.
*B32B 15/04* (2006.01)
*B32B 1/00* (2006.01)
*B32B 3/12* (2006.01)
*B32B 3/18* (2006.01)
*B32B 15/18* (2006.01)
*B32B 5/14* (2006.01)
*B32B 15/20* (2006.01)
*F02C 7/04* (2006.01)
*F02C 7/24* (2006.01)
*B23K 101/02* (2006.01)
*B23K 103/14* (2006.01)
*B23K 1/00* (2006.01)

(52) U.S. Cl.
CPC .............. *B32B 5/142* (2013.01); *B32B 15/01* (2013.01); *B32B 15/043* (2013.01); *B32B 15/18* (2013.01); *B32B 15/20* (2013.01); *F02C 7/04* (2013.01); *F02C 7/24* (2013.01); *B23K 1/0018* (2013.01); *B23K 2101/02* (2018.08); *B23K 2103/14* (2018.08); *B32B 2250/40* (2013.01); *B32B 2307/102* (2013.01); *F05D 2220/323* (2013.01); *F05D 2230/237* (2013.01); *F05D 2230/238* (2013.01); *F05D 2250/283* (2013.01); *F05D 2260/963* (2013.01); *F05D 2300/133* (2013.01); *Y02T 50/672* (2013.01)

(56) References Cited

U.S. PATENT DOCUMENTS

| | | | | |
|---|---|---|---|---|
| 3,072,225 A * | 1/1963 | Long | ................ | B23K 1/0014 428/593 |
| 3,679,384 A * | 7/1972 | Colson | ................ | B32B 3/12 65/439 |
| 3,887,031 A * | 6/1975 | Wirt | ................ | E04B 1/86 181/286 |
| 4,298,090 A * | 11/1981 | Chapman | ................ | F02C 7/24 181/286 |
| 4,421,201 A * | 12/1983 | Nelsen | ................ | F02C 7/045 181/214 |
| 4,453,367 A * | 6/1984 | Geyer | ................ | E04C 2/365 264/177.12 |
| 4,906,508 A * | 3/1990 | Blankenburg | ....... | B29D 24/008 428/116 |
| 7,452,585 B1 | 11/2008 | Wong et al. | | |
| 8,696,843 B1 * | 4/2014 | Dean | ................ | B64F 5/40 156/98 |
| 9,127,452 B1 * | 9/2015 | Winfield | ................ | B32B 5/022 |
| 9,222,229 B1 * | 12/2015 | Chang | ................ | G10K 11/168 |
| 9,550,347 B2 * | 1/2017 | Kendrick | ................ | B32B 3/12 |
| 2002/0050420 A1 * | 5/2002 | Porte | ................ | B32B 3/12 181/292 |
| 2006/0070345 A1 | 4/2006 | Young et al. | | |
| 2007/0243408 A1 | 10/2007 | Straza | | |
| 2009/0178410 A1 * | 7/2009 | Straza | ................ | B29D 99/0089 60/725 |
| 2011/0108357 A1 * | 5/2011 | Vauchel | ................ | F02K 1/827 181/222 |
| 2012/0037449 A1 * | 2/2012 | Ayle | ................ | G10K 11/172 181/292 |
| 2014/0329043 A1 * | 11/2014 | Shigetomi | ................ | F02C 7/045 428/63 |
| 2015/0027629 A1 * | 1/2015 | Butler | ................ | G10K 11/172 156/306.6 |
| 2015/0041248 A1 * | 2/2015 | Ichihashi | ................ | E04B 1/84 181/292 |

FOREIGN PATENT DOCUMENTS

| | | |
|---|---|---|
| JP | H06106662 | 4/1994 |
| JP | 2010169115 | 8/2010 |

* cited by examiner

COMPOSITE PANEL AND AIRCRAFT TURBOJET ENGINE NACELLE COMPRISING SUCH A PANEL

CROSS-REFERENCE TO RELATED APPLICATIONS

This application is a continuation of International Application No. PCT/FR2016/051108, filed on May 11, 2016, which claims priority to and the benefit of FR 15/54228 filed on May 12, 2015. The disclosures of the above applications are incorporated herein by reference.

FIELD

The present disclosure relates to a composite panel and in particular to an aircraft turbojet engine nacelle comprising such a composite panel.

BACKGROUND

The statements in this section merely provide background information related to the present disclosure and may not constitute prior art.

It is already known, in particular in the field of aeronautics, to use composite panels having a sandwich structure formed by a central core having a cellular structure, for example of the honeycomb type, sandwiched between two skins.

These composite panels may also be acoustic attenuation panels designed to reduce noise emissions from turbojet engines, these panels generally having a sandwich structure comprising:

an outer (oriented towards the source of the noise) air-permeable perforated skin, called "resistive" or "acoustic" skin, whose role is to dissipate the acoustic energy;

a central core having a cellular structure of the honeycomb type; and an inner skin formed by a solid skin (opposite to the source of the noise), called structuring skin.

In some cases, the composite panels must be designed to be installed in the hot area of an aircraft turbojet engine nacelle, and in particular in the downstream portion of this nacelle through which exhaust gases are expelled.

The use of such composite panels is generally structural and, in the case of acoustic attenuation panels in this exhaust area, this also allows substantially reducing the sound emissions located in the high-frequency range.

Moreover, in order to resist some structural constraints, it is known to use several composite panels, some of which, located at the most structurally stressed constraint areas, comprise a central core having a denser cellular structure than that of the adjacent panels.

Another alternative for structurally reinforcing a composite panel is to join, edge-to-edge, two cellular structures of a different density, the area intended to be the most stressed being provided with a cellular structure of a greater density, for example by means of cells of smaller size or by means of thicker thickness of the walls delimiting the cells.

However, these solutions have in particular the disadvantage of requiring one or more junction(s) between two distinct cellular structures, or even between two composite panels. These junctions constitute areas of weakness in case of strong mechanical and thermal stresses, but also upon the installation of through-fasteners.

Moreover, for the particular applications in the field of aeronautics, and in particular in the use of such composite panels on nacelles of aircraft turbojet engines, said panels generally present reliefs such as curvatures, that is to say they are not planar.

In this context, the forces exerted on junctions between two distinct cellular structures, or even between two distinct composite panels, at such curvatures tend to further weaken the structural assembly.

SUMMARY

The present disclosure provides a sandwich structure that can be reinforced at least locally in a simple manner, improved and compatible with the constraints linked to a use in a turbojet engine nacelle for an aircraft.

To this end, the present disclosure provides a composite panel comprising a sandwich structure formed by a central core having a primary cellular structure, for example of the honeycomb type, sandwiched between two skins, the primary cellular structure comprising an array of main cells, the composite panel being characterized in that it comprises a plurality of pins, each pin being, on the one hand, arranged to be housed and to cooperate inside a main cell and, on the other hand, formed of a secondary cellular structure comprising an array of secondary cells.

Such a sandwich structure formed by the primary cellular structure thus retains its structural integrity and does not present any area of weakness linked to a particular junction.

In other words, the primary cellular structure is continuous beyond a simple reinforcement area of the panel, a reinforcement area at which the pins are placed.

Moreover, each pin being housed and cooperating inside a main cell, they participate in the structural reinforcement of the panel, the forces exerted both on the primary and secondary cellular arrays. Indeed, since the pins cooperate inside the main cells, the walls delimiting the main cells are in contact (for example, soldered or bonded connection) with the secondary cellular structure forming the associated pin, around the periphery of said pin, in particular in a discontinuous manner. In this way, the forces exerted on the primary cellular structure are transmitted equally to each secondary cellular structure, namely to each pin.

Finally, each pin being housed inside a main cell, it does not create a discontinuity at the associated skin.

According to an advantageous technical configuration, each of the pins has a height substantially equal to a thickness of the primary cellular structure.

Such a characteristic allows in particular an improved reinforcement of the composite panel when subjected to compressive forces. Indeed, in this case, the walls delimiting each of the primary and secondary cells work locally and together in compression.

Advantageously again, the composite panel comprises at least one area of curvature or curved area, the pins being located at said area of curvature.

In this way, the panel retaining a structural integrity in particular at its primary cellular array, the area of curvature can be reinforced without involving junctions which would represent areas of weakness.

Advantageously, the main cells and the secondary cells have a section of the same shape.

According to a particular configuration, the main and/or secondary cells have a section of hexagonal shape.

According to a particular characteristic, the composite panel is made of metal, such as titanium. However, other materials such as stainless steel, aluminum, a nickel alloy, carbon/epoxy, polybismaleimide (BMI), poly (p-phenylene terephthalamide) (PPD-T), fiberglass, ceramic matrix composites (CMC), and/or oxide-oxide composites can be used.

Indeed, for particular applications at high temperature, composite panels are generally used whose skins are formed by a metal sheet and the cellular structure forming the central core is also made of metal.

The cellular structure forming the central core can then be linked by soldering to the metal sheets.

By definition, the soldering is a method for assembling two elements using a filler metal with a melting temperature lower than that of the base metal of the elements. By bringing the filler metal to its melting temperature, the latter liquefies and wets the base metal with which it is in contact and then diffuses inside the latter. Then, by cooling the assembly, the filler metal solidifies and provides the connection between the different elements in contact.

The cellular structure forming the central core can also be linked by bonding to the skins in the case where other materials are used.

Advantageously, the pins are formed of the same material as that forming the primary cellular structure.

According to a particular characteristic, the composite panel is an acoustic attenuation panel, one of the skins being a perforated skin.

According to another aspect, the present disclosure also concerns an inner fixed structure for an aircraft nacelle, characterized in that it comprises at least one composite panel including all or part of the aforementioned characteristics.

According to another aspect, the present disclosure provides a nacelle for an aircraft, characterized in that it comprises a composite panel including all or part of the aforementioned characteristics, or at least one inner fixed structure comprising such a composite panel.

In addition, the present disclosure also concerns a method for manufacturing a composite panel including all or part of the aforementioned characteristics, the method being characterized in that it comprises:
  a step of inserting pins into main cells, each pin being housed and cooperating within a main cell; and
  a step of fastening the skins on each side of the primary cellular structure provided with the pins, so that the primary cellular structure provided with the pins is sandwiched between two skins.

Such a method is therefore very simple to use and quick to implement while limiting the additional cost of production. Furthermore, it is not necessary for the operators to be specifically formed to apply such a method, which facilitates the implementation thereof.

According to an advantageous characteristic, the step of fastening the skins is a step of soldering the primary cellular structure provided with the pins and sandwiched between two skins. This is in particular the case when the composite panel is made of metal.

Indeed, the use of such pins is particularly advantageous in this context since they are compatible with a soldering step.

Alternatively, the step of fastening the skins is a step of bonding the skins with the primary cellular structure and with the pins, in particular when said pins have a height substantially equal to the thickness of the primary cellular structure. This is in particular the case when the panel is made of composite material(s), for example of carbon.

Advantageously again, the method includes a preliminary step of curvature of the primary cellular structure, prior to the step of inserting pins into said main cells.

Indeed, the implementation of the step of inserting pins into main cells after the curvature of said primary cellular structure allows limiting the risk of tearing the walls of the main cells, which allows not weakening the array of main cells.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
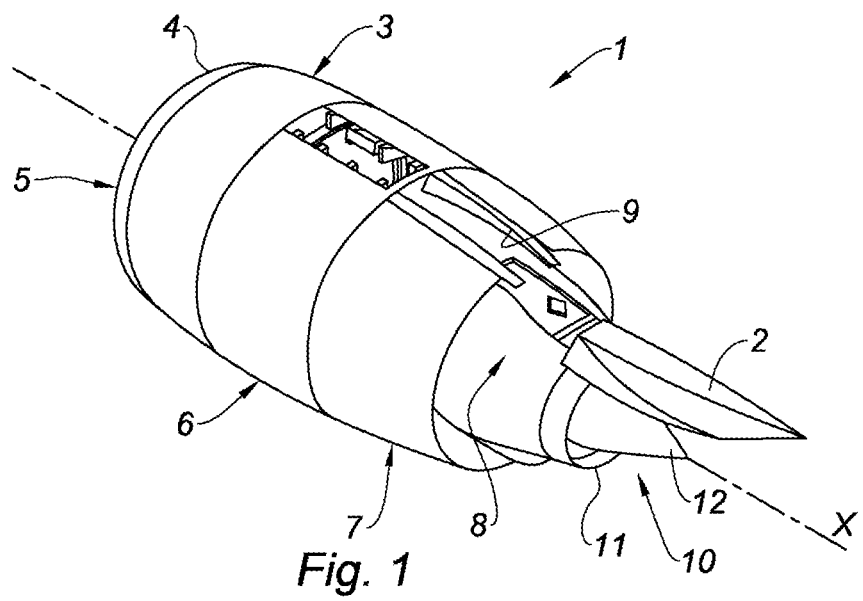
FIG. 1 is a general representation of a turbojet nacelle for an aircraft to which the teachings of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a nacelle 1 has a substantially tubular shape according to a longitudinal axis X. This nacelle 1 is intended to be suspended from a pylon 2, itself fastened under a wing of an aircraft.

In general, the nacelle 1 comprises a front or an upstream section 3 with an air inlet lip 4 forming an air inlet 5, a median section 6 surrounding a fan of a turbojet engine (not shown) and a rear or downstream section 7. The downstream section 7 comprises an inner fixed structure 8 (IFS) surrounding the upstream portion of the turbojet engine and an outer fixed structure (OFS) 9.

The IFS 8 and the OFS 9 delimit an annular flow path allowing the passage of a main air flow penetrating the nacelle 1 at the air inlet 5.

The nacelle 1 thus includes walls delimiting a space, such as the air inlet 5 or the annular flow path, in which the main air flow penetrates, circulates and is ejected.

The nacelle 1 ends with an ejection nozzle 10 comprising an outer module 11 and an inner module 12. The inner 12 and outer 11 modules define a flow channel for a hot airflow leaving the turbojet engine.

Figure 2:
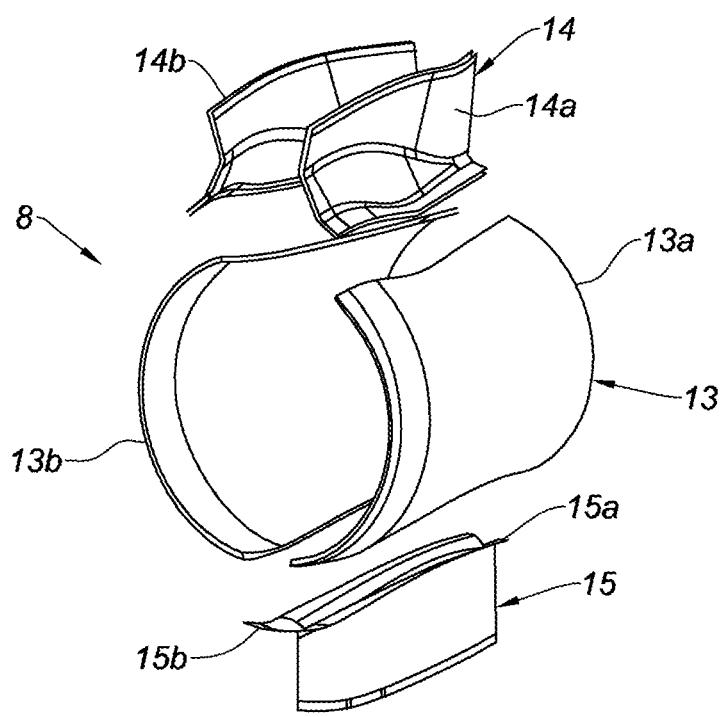
FIG. 2 illustrates an exploded view of an inner fixed structure of the nacelle of FIG. 1.

FIG. 2 illustrates an exploded view of the inner fixed structure 8 of the nacelle 1. In this form, the IFS 8 comprises a barrel 13 composed of two walls 13a, 13b of substantially semi-circular shape, each forming a half of a barrel so that, when assembled, these walls 13a, 13b form the barrel 13 of generally cylindrical shape with a longitudinal axis X.

In addition, the IFS 8 comprises two islets 14, 15 to provide a structural link between the IFS 8 and the OFS 9. One 14, called islet 12H is arranged to be placed vertically above the barrel 13, and the other 15 called islet 6H is arranged to be placed vertically below the barrel 13. Each of these islets 14, 15 is here composed of two sets of parts 14a, 14b 15a, 15b, each being intended to be assembled with one of the walls forming a half-barrel.

The sets of parts composing in particular this IFS 8, as well as many other parts of the nacelle 1, are generally composite panels 20' composed of several parts, namely two skins 22 and a central core 21 having a cellular core structure of the honeycomb type sandwiched between the two skins 22. These composite panels 20 offer weight gain and improved strength.

Figure 3:
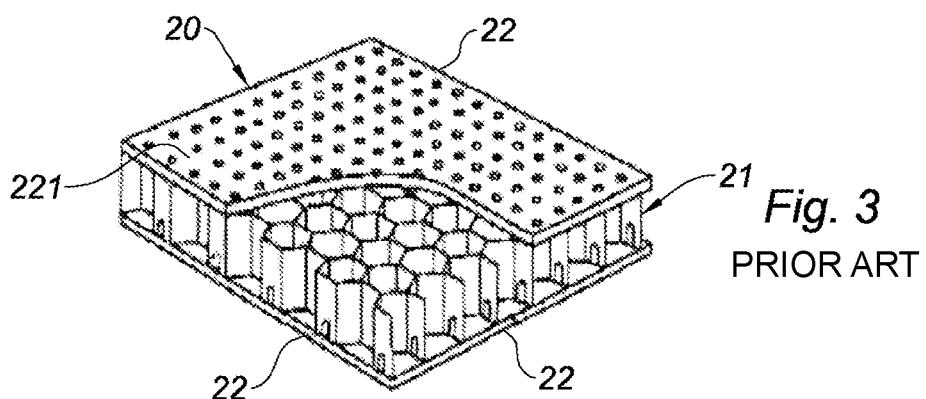
FIG. 3 illustrates a cutaway view of an acoustic panel according to the prior art.

These composite panels 20 can also be acoustic attenuation panels provided to reduce the noise emissions from the turbojet engines. This type of panel, illustrated in FIG. 3, generally has a sandwich structure comprising:

an outer (oriented towards the source of the noise) air-permeable perforated skin 221, called "resistive" or "acoustic" skin, whose role is to dissipate acoustic energy;

a central core 21 having a cellular structure of the honeycomb type; and, an inner skin 222 formed by a solid skin (opposite to the source of the noise), called structuring skin.

The present disclosure described hereinafter is particularly advantageous in the manufacture of these composite panels intended to equip a nacelle.

Figure 4:
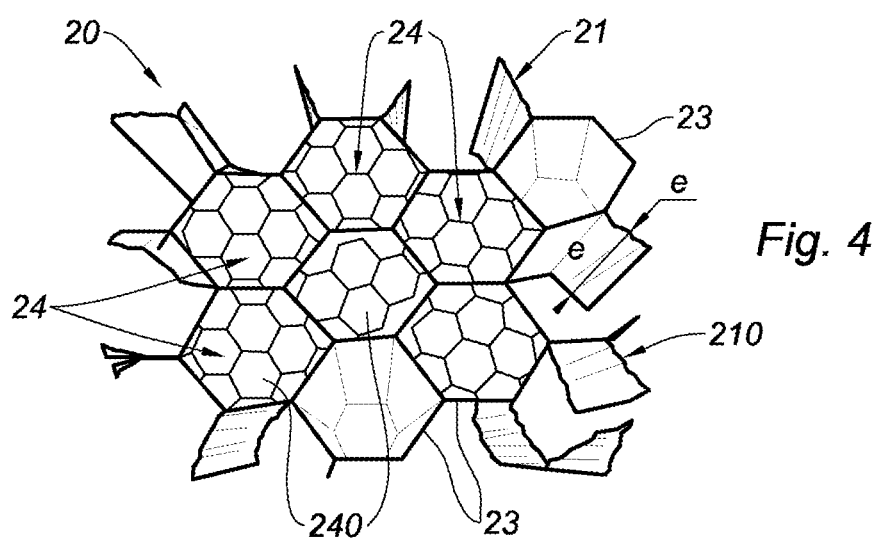
FIG. 4 illustrates a portion of a composite panel according to one form of the present disclosure.

FIG. 4 illustrates a portion of a sandwich structure formed by a central core 21 having a primary cellular structure 210 of the honeycomb type. This central core 21 is intended to be sandwiched between two skins to form the composite panel 20.

To make the figure more readable, the skins are not illustrated in this figure.

The primary cellular structure 210 comprises an array of main cells 23, said main cells 23 having a hexagonal-shaped section forming a honeycomb-type structure.

The composite panel 20 comprises a plurality of pins 24, each pin 24 being, on the one hand, arranged to be housed and to cooperate inside a main cell 23 and, on the other hand, formed of a secondary cellular structure 240 comprising an array of secondary cells 25. These secondary cells 25 have also a hexagonal-shaped section forming a honeycomb-type structure.

In this way, by inserting and housing a secondary cellular structure 240 inside the main cell 23, this secondary cellular structure 240 will reinforce structurally the primary cellular structure 210 of the honeycomb type. More precisely here, the secondary cells 25 of the secondary cellular structure 240 are placed, in the inserted position of the pin 24, parallel to the main cells 23 of the primary cellular structure 210.

Moreover, this structural reinforcement is carried out without creating a discontinuity in the primary cellular structure 210 of the honeycomb type. In other words, the sandwich structure formed by the primary cellular structure 210 thus retains its structural integrity and may not present an area of weakness linked to any junction.

In one form, these pins 24 are located together on an area of the panel, defining a reinforcement area of the primary cellular structure 210, that is to say still a reinforcement area of the panel 20.

In this configuration, the primary cellular structure 210 retains its structural integrity and extends continuously beyond this reinforcement area, in particular over the whole extent of the composite panel 20.

Due to the cooperation of the pins 24 with the main cells 23, the latter, in the inserted position, are each in contact and in support with side walls of the main cell 23 which delimits it, the main cells 23 having a closed contour. In this way, the forces exerted on the primary cellular structure 210 will be transmitted to each of the secondary cellular structures 240, that is to say again, to each of the pins 24.

This amounts to placing inserts having a cellular structure in cells of larger dimensions relative to those of the insert itself. For example, it may be a pin or an insert of the honeycomb type in cells of a honeycomb-type structure forming the core 21 of a composite panel 20.

In one form, as it is the case here, each of the pins 24 has a height substantially equal to a thickness e of the primary cellular structure 210. In other words, each of the two ends of the pins 24 is flush with a surface of the primary cellular structure 210 on which each of the skins will be fastened, for example by soldering, on one side of the central core and on the other opposite side. The distance between these two opposite surfaces of the primary cellular structure 210 defining its thickness "e" as shown.

In the particular case where the composite panel 20 is intended to form at least a portion of an inner fixed structure 8 for a nacelle 1 of an aircraft turbojet engine, such as an acoustic attenuation panel, the latter is generally made of metal in order to resist the different thermal constraints relating to the use of the turbojet engine of the aircraft.

In this example, the central core 21 formed by the primary cellular structure 210, as well as the pins 24 and the skins 22, are made of titanium. It should be noted, however, that other metals such as aluminum, stainless steel or a nickel alloy may be used.

In this case, the central core 21 and the skins are generally assembled by soldering.

The pins 24 being disposed in the inserted position exclusively inside the main cells 23 of the central core 21, the latter do not interfere with the application of the skins to the central core 21. Moreover, the use of such pins 24 is compatible with such a soldering step.

In general, a method for manufacturing a composite panel 20 as described hereinbefore comprises:

a step of inserting pins 24 into main cells 23, each pin 24 being housed and cooperating within a main cell 23; and a step of fastening the skins 22 on each side of the primary cellular structure 210 provided with the pins 24 so that the primary cellular structure 210 provided with the pins 24 is sandwiched between two skins 22.

In the particular case where the composite panel 20 is composed of metals, the step of fastening the skins is in one form a soldering step of the primary cellular structure 210 provided with the pins 24 and sandwiched between the two skins 22.

In this case, the soldering step allows the pins to be fastened:

on the one hand at its ends with the skins 22 when each of the pins 24 has a height substantially equal to a thickness e of the primary cellular structure 210; and on the other hand, laterally between side edges of the pin 24 with the side walls delimiting the associated main cells 23, the latter being in contact. This fastening being permitted during soldering by capillary rise.

Alternatively, in the particular case where the composite panel 20 is made of composite materials, the step of fastening the skins is a step of bonding the skins on the central core 21 formed by the primary cellular structure 210 and provided with the pins 24 so that said central core 21 is sandwiched between the two skins 22.

In this case, the bonding step allows fixing the pins 24 at its ends with the skins 22 located on either side of the central core 21 when each of the pins 24 has a height substantially equal to the thickness e of the primary cellular structure 210. Moreover, each pin 24 cooperating inside a main cell 23, its side edges are in contact with the walls delimiting the associated main cell 23 having a closed contour when they are fitted into said main cells 23, and thus do not require bonding.

The pins 24 being formed of a secondary cellular structure 240 comprising an array of secondary cells 25, its side edges are cut walls of this array of secondary cells 25. The contacts between these side edges of the pin and the walls delimiting the associated main cell 23 are therefore discontinuous along the closed contour of said main cell.

As can be seen in FIG. 2, the composite panels 20 are generally not planar and have areas of curvature. In order to reinforce the composite panels 20 locally, without burdening the inner fixed structure 8 and hence the nacelle more than necessary, the pins 24 are located at these areas of curvature, these areas being the most stressed.

In this form, the primary cellular structure 210 comprises an array of main cells 23 of size ⅜ of inch (0.009525 m) and the secondary cellular structure 240 comprising an array of secondary cells 25 of size ⅛ inch (0.003175 m). These sizes are given by way of example, it is generally understood that the secondary cells 25 are smaller in size than the main cells 23.

Figure 5:
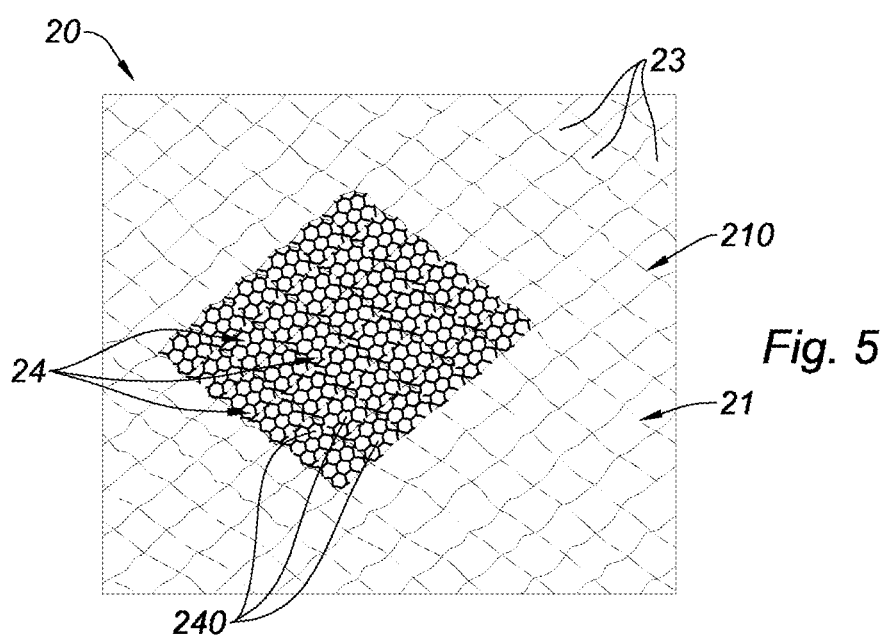
FIG. 5 illustrates a portion of a composite panel according to another form of the present disclosure.

FIG. 5 illustrates a portion of a sandwich structure formed by a central core 21 having a primary cellular structure 210 of the honeycomb type, according to another form, this central core 21 being intended to be sandwiched between two skins (not shown here) to form the composite panel 20.

This form differs essentially from that illustrated in FIG. 4 in that the main cells 23 are not hexagonal but generally diamond-shaped. However, they may be of another shape, for example square-shaped.

The reinforcement area, defined by the area where the pins 24 are located in the primary cellular structure 210 is here a substantially diamond-shaped area.

In one form, as illustrated in FIG. 5, the main cells 23 of the primary cellular structure 210 forming a reinforcement area house a pin 24. In other words, a reinforcement area does not present a main cell 23 which would be empty that is to say without pin 24.

Figure 6:
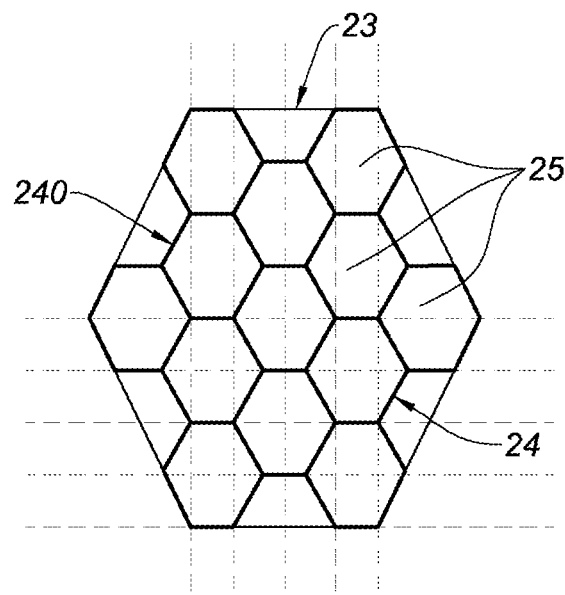
FIG. 6 illustrates a pin cooperating inside a main cell of a primary cellular structure according to one distinct form the present disclosure.
Figure 7:
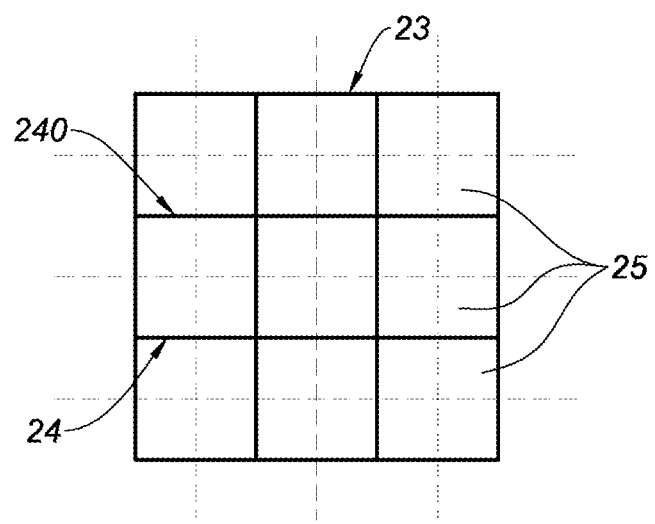
FIG. 7 illustrates another form of a pin cooperating inside a main cell of a primary cellular structure according to another distinct form of the present disclosure.

FIGS. 6 and 7 each illustrate a pin 24 cooperating inside a main cell 23 of the primary cellular structure 210 according to two distinct forms.

In these two examples, the main cells 23 and the secondary cells 25 have a section of the same shape:
in FIG. 6, the main cell 23 and the secondary cells 25 of the pin 24 have a hexagonal-shaped section; and
in FIG. 7, the main cell 23 and the secondary cells 25 of the pin 24 have a square-shaped section.

Moreover, in these two forms, the pin 24 has a shape that is particularly adapted to the main cell 23 inside which it is housed and cooperates.

More precisely, the ratio of the dimension of the main cell 23 on the dimension of one of the secondary cells 25 of the associated pin 24 is here an integer. In this way, and in the case where the main cells 23 and the secondary cells 25 have a section of the same shape, an envelope circumscribed to the peripheral walls of the pin 24 has a section substantially identical to that of the associated main cell 23. The cooperation of the pins 24 with the main cells 23 is thus improved.

In FIG. 6, for example, the dimensions of the main cell 23 with a hexagonal section are four times larger than those of a secondary cell 25 of the pin 24 also with a hexagonal section, said secondary cells 25 of the pin 24 being, in turn, of the same dimensions. This ratio may vary depending on the desired reinforcement and density. In particular, the greater the desired density, the greater the ratio will be.

In FIG. 7, the dimensions of the main cell 23 with a square section are three times larger than those of a secondary cell 25 of the pin 24 also with a square section, said secondary cells 25 of the pin 24 being, in turn, of the same dimensions.

The contacts between the pin 24 and the walls delimiting the main cell 23 are only surface contacts. This, unlike the form illustrated for example in FIG. 4, where the side edges of the pins 24 are cut walls of its array of secondary cells 25. As a result, the contacts between the pin 24 and the walls delimiting the main cell 23 are essentially linear.

It will be noted that this surface contact is continuous in the case of FIG. 7 and discontinuous in the case of FIG. 6 around the periphery of the pin 24.

Such surface-only contacts between peripheral walls of the array of secondary cells 25 of the pin 24 and the walls delimiting the associated main cell 23 provide a better reinforcement of the composite panel 20.

The present disclosure is described in the foregoing by way of example. It is understood that a person skilled in the art is able to carry out different variants of the present disclosure without departing from the scope of the present disclosure.

For example, it is described that the pins are, in one form, located at an area of curvature to reinforce this area in particular, while maintaining the structural integrity of the panel, in particular at its array of primary cells.

More generally, the pin as described allows consolidating any areas where a force is required, such as the reinforcement of a sandwich panel for example, at the installation of fasteners of a lock, of joining panels, etc.

It will be also noted that the section of the main cells 23 is independent of that of the secondary cells 25. However, a particularly improved strength has been observed for main 23 and secondary 25 cells each with a hexagonal section.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A non-planar composite panel comprising a sandwich structure formed by a central core having a primary cellular structure of a honeycomb type, sandwiched between two skins, the primary cellular structure comprising an array of main cells, the non-planar composite panel comprising:
a plurality of pins, each pin being arranged to be housed and to cooperate inside a main cell of the array of main cells, such that each pin is in contact with and supports side walls of the main cell, and each pin being formed of a secondary cellular structure of a honeycomb type, the secondary cellular structure comprising:

an array of secondary cells having cell walls forming a hexagonal-shaped section parallel to the main cells of the primary cellular structure; and at least one area of curvature, wherein the plurality of secondary cell walls are located at said area of curvature such that the secondary cell walls reinforce the primary cellular structure.

2. The non-planar composite panel according to claim 1, wherein the secondary cellular structure has a height substantially equal to a thickness of the primary cellular structure.

3. The non-planar composite panel according to claim 1, wherein at least one of the main cells have a hexagonal-shaped section.

4. The non-planar composite panel according to claim 1, wherein the non-planar composite panel is made of titanium.

5. The non-planar composite panel according to claim 1, wherein the non-planar composite panel forms an acoustic attenuation panel.

6. An inner fixed structure for an aircraft turbojet engine nacelle comprising at least one non-planar composite panel according to claim 1.

7. A nacelle for an aircraft turbojet engine comprising at least one inner fixed structure according to claim 6.

8. A method for manufacturing the composite panel of claim 1, the method comprising:

inserting the secondary cellular structure inside the primary cellular structure; and fastening the two skins on opposed sides of the primary cellular structure that is provided with the secondary cellular structure such that the primary cellular structure is sandwiched between the two skins.

9. The method according to claim 8, wherein the step of fastening the skins is performed by soldering.

* * * * *